3,365,515
METHYL ALCOHOL-OLEUM ALKYLATION
Charles O. Petty, 2318 McCullar Drive, and Robert Kung, 4119 Birdwell Drive, both of Tyler, Tex. 75701
No Drawing. Filed June 9, 1965, Ser. No. 462,748
7 Claims. (Cl. 260—683.63)

This invention relates to sulfuric acid alkylation comprising predominantly the reaction between isobutane and isobutylene and other hydrocarbon components such as propane, propylene, butene, butane, pentene, pentane and other hydrocarbons contained in typical olefinic $C_3$–$C_5$ petroleum refinery gas mixtures. More particularly, this invention relates to use of large quantities of methanol in oleum, about 20 to 25% sulfur trioxide ($SO_3$) solution in sulfuric acid as alkylation reagent.

In typical alkylation the solubility in the acid and alkylating activity of isobutane are considered to depend upon the strength of the acid. Greater alkylation yields are available with higher strength acid. That increased yield is also considered to be available with greater solubility of isobutane in the acid which in turn varies with the quantity of hydrocarbon already dissolved in the acid serving to solubilize more isobutane. However, the greater quantity of dissolved hydrocarbon in itself reduces the strength of the acid, and when the acid strength drops below about 88 or 89% the isobutane alkylation yield rapidly decreases. Hence, such increased solubility is self limiting.

According to the present invention, it is found that the apparent solubility of isobutane in the alkylation acid is greatly increased by use of substantial quantities of methanol dissolved in oleum as the alkylation acid medium. Methanol reacts with the strong 99% sulfuric acid to form methyl acid sulfate, the half-ester, which is as active an alkylating acid as the strong sulfuric acid appears to be alone. Consequently, the apparent dilution of the acid by the presence of methanol can be substantial, up to about 25%, such as 15 to 25%, whereby the apparent acidity of the alkylating acid considered as sulfuric acid becomes reduced to about 75% as a maximum and still gives the apparent alkylating activity and strength of a much stronger acid, while simultaneously increasing the solubility of isobutane in the acid alkylating medium. A consequence is a substantially increased yield of alkylate in comparison to ordinary alkylation acid obtained with the apparent anomaly of using a lower concentration of sulfuric acid due only to the presence of the methanol.

The methanol reacts with sulfuric acid to form the methyl acid sulfate together with water according to the following equation:

(1)
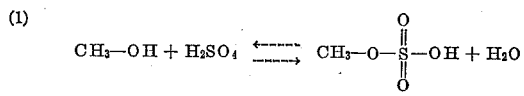

For that reason, i.e. the formation and presence of water which directly reduces the strength of the acid without any compensating solubilizing effect, methanol cannot be used with strong sulfuric acid alone as an alkylating acid reagent.

It is found, according to the present invention, that methanol can be used with 20 to 25% oleum, for instance 23% oleum, which is the more commonly available commercial form. The sulfur trioxide dissolved in the sulfuric acid to form the oleum will react directly with the water to produce more sulfuric acid according to the following equations:

(2)
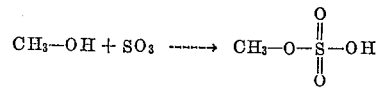

The combined equations which reflect the reactions that result upon admixture of methanol and oleum are as follows:

(3a)
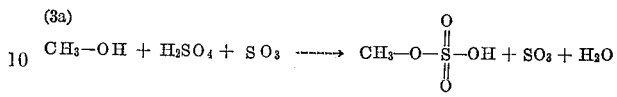

(3b)
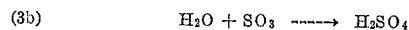

Thus, according to the present invention, the intermixture of methanol in quantity up to approximately the stoichiometric quantity of $SO_3$ in the oleum, and preferably 15 to 25%, forms a strong alkylation acid superior for alkylating isobutene-butylene mixtures such as typically $C_3$–$C_5$ petroleum gas mixtures in higher yield. Because of the interaction of the several components, the esterification of the acid and reaction of $SO_3$ with the water formed, according to the Equation 3b set forth above with some release of heat, the methanol and oleum are first cooled such as to about 32° F. and then admixed. The resulting acidity obtained in various concentrations of such mixtures is set forth in the following table:

TABLE 1

| Volume percent | | Weight percent | | Acidity as $H_2SO_4$ |
|---|---|---|---|---|
| Methyl Alcohol | Oleum | Methyl Alcohol | Oelum | |
| 5 | 95 | 2.25 | 97.75 | 100.77 |
| 10 | 90 | 4.5 | 95.5 | 95.00 |
| 15 | 85 | 6.75 | 93.25 | 87.80 |
| 20 | 80 | 9.00 | 91.00 | 82.50 |
| 25 | 75 | 11.25 | 88.75 | 73.50 |

It will be noted, for example, that if ordinary acid were used instead of oleum, the acidity would be substantially lower even when using lesser quantities of alcohol, according to the following table:

TABLE II

| Volume Percent | | Weight Percent | | Acidity as $H_2SO_4$ |
|---|---|---|---|---|
| Methyl Alcohol | 99% $H_2SO_4$ | Methyl Alcohol | 99% $H_2SO_4$ | |
| 10 | 90 | 4.5 | 95.5 | 89.6 |
| 20 | 80 | 9.0 | 91.0 | 75.7 |

Examples

Olefine feed was alkylated with isobutane using the mixtures of methyl alcohol-oleum and methyl alcohol-$H_2SO_4$ shown in Tables III and IV. The alkylations were carried out as follows: Six hundred milliliters of the acid mixture were cooled to 0° F. and poured into a Pyrex distillation receiving jar. The jar was covered with a piece of ½" thick rubber. Two pieces of stainless steel tubing, one for isobutane and one for olefine feed, were inserted through holes in the rubber so that the open ends were near the bottom of the jar and well below the level of the acid. A 500 ml. bomb of olefine feed was connected to one tube, and a large bomb of isobutane was attached to the other. A mixer (Brookfield) was inserted through a hole in the center of the rubber and positioned so that the mixing blades were about 2" below the level of the acid. The mixer was started and isobutane added until about 400 ml. of liquid had collected in the reactor. The addition of isobutane was continued and olefine feed was then started at a rate of about 20 ml. per minute. When the olefine feed bomb (500 ml.) was emptied, the isobutane was shut off and the mixing continued for 5 minutes. The acid was allowed to settle and then separated from the hydrocarbon in a separatory funnel. The hydrocarbon was weathered at 100° F. to drive off most of the isobutane and then the gravity and volume were recorded. The feed consisted of propylene 20%, propane 20%, isobutane 15%, $C_4$ olefine 25%, normal butane 6%, iso-pentane 9%, and $C_5$ olefine 5%, by volume.

The results of these alkylations are shown in Table III.

The results show that mixtures of methyl alcohol with 99% sulfuric acid were poor alkylating catalysts apparently because of the evolution of water, which dilutes the acid; that is, a mol of water is produced for each mol of methyl sulfuric acid formed according to Equation 1 above. On the other hand, when oleum is used with the methyl alcohol the $SO_3$ binds the free water, forming more sulfuric acid, according to Equation 3b. Simultaneously the methyl alcohol reacts with sulfuric acid or $SO_3$ to form methyl sulfuric acid which further apparently improves the solvent effect of the alkylating acid without reducing its alkylating strength. In any case, substantial improvement in the yield of alkylate results.

TABLE III

| Type of Acid | Acid Strength | | Olefine Feed Ml | Product | |
|---|---|---|---|---|---|
| | Before Run | After Run | | Ml at 100° F. | API Gravity |
| Alkylation Unit | 91.31 | 91.23 | 500 | 260 | 69.4 |
| 10% Methyl Alcohol / 90%, 99% $H_2SO_4$ | 89.6 | 89.3 | 500 | 190 | 69.7 |
| 20% Methyl Alcohol / 80%, 99% $H_2SO_4$ | 75.7 | 75.6 | 500 | 50 | 61.3 |
| 20% Methyl Alcohol / 80%, 23% $SO_3$ Oleum | 82.5 | 82.4 | 500 | 265 | 68.9 |
| 25% Methyl Alcohol / 75%, 23% $SO_3$ Oleum | 73.2 | 73.2 | 500 | 260 | 69.2 |
| 50% Methyl Alcohol / 50%, 23% $SO_3$ Oleum | 35.2 | 30.0 | 500 | 0 | ---------- |

After the results shown in Table III were obtained, a comparison between Alkylation unit acid and 20 volume percent methyl alcohol-80 volume percent oleum was made. Three 500 ml. bombs of weighed olefine were alkylated with each batch of acid under similar conditions and the results are shown in Table IV.

TABLE IV

A. ALKYLATION

| Kind of Acid | Run. No. | Wt. Percent Acid as $H_2SO_4$ | Olefin Feed, grams | Product Ml | Contact Time |
|---|---|---|---|---|---|
| MeOH-Oleum | 1 | 83.5 | 293 | | 36 |
| Do | 2 | 83.5 | 274 | | 42 |
| Do | 3 | 83.5 | 287 | | 45 |
| Total | | | 854 | 800 | |
| Alkylation Unit | 1 | 92.2 | 270 | | 60 |
| Do | 2 | 92.2 | 190 | | 60 |
| Do | 3 | 92.2 | 280 | | 30 |
| Total | | | 740 | 650 | |

B. PRODUCT PROPERTIES

| | MeOH-Oleum | Alkylation Unit Acid | | | MeOH-Oleum | Alkylation Unit Acid |
|---|---|---|---|---|---|---|
| API | 70.0 | 70.0 | | Octane Res +3 cc | 102.6 | 103.3 |
| Distillation: | | | | $iC_4$ Vol. | | |
| IBP | 88 | 88 | | percent | 7.53 | 8.03 |
| 10% | 154 | 150 | | $nC_4$ | 1.51 | 1.39 |
| 20% | 200 | 190 | | $iC_5$ | 9.64 | 8.82 |
| 30% | 224 | 220 | | $iC_5$ | 1.41 | 0.82 |
| 40% | 238 | 240 | | $iC_6s$ | 6.58 | 8.50 |
| 50% | 245 | 246 | | $iC_7s$ | 3.36 | 4.06 |
| 60% | 258 | 268 | | $iC_7s(C_3$ | | |
| 70% | 325 | 302 | | Alk.) | 6.88 | 6.81 |
| 80% | 384 | 360 | | iso-octane | 17.84 | 17.75 |
| 90% | | 490 | | $iC_8s$ | 19.41 | 18.03 |
| E.P. | 500 | 520 | | $iC_9s$ | 15.19 | 16.26 |
| Rec | 87.0 | 90.0 | | $C10s+$ | 10.65 | 9.53 |
| Res | 1.5 | 1.5 | | | | |
| Loss | 11.5 | 8.5 | | | | |

We claim:
1. The method of alkylating gaseous olefine with gaseous paraffin, comprising contacting a gaseous mixture of said olefin and paraffin with a mixture of a major quantity of oleum and a minor quantity of methanol not exceeding the stoichiometric quantity of $SO_3$ in said oleum.

2. The method of claim 1 wherein said gaseous mixture is a $C_3$-$C_5$ mixture of petroleum refinery olefine and paraffin gases.

3. The method of claim 1 wherein the mixed olefine and paraffin gases contain substantially large quantities of isobutane and butylenes.

4. The method of claim 1 wherein the methanol is mixed with the oleum in quantity of from 15 to 25% by volume.

5. The method of claim 1 wherein the oleum is concentrated sulfuric acid containing 20 to 25% of $SO_3$ and the methanol is added to the oleum in quantity of 15 to 25% by volume.

6. The method of claim 1 wherein the mixed hydrocarbon gases are a $C_4$ refinery gas mixture containing both isobutane and butenes.

7. The method of alkylating a $C_3$-$C_5$ refinery gas mixture containing substantial quantities of isobutane and butenes, comprising contacting said gas mixture with an alkylation acid consisting essentially of oleum containing 20 to 25% of sulfur trioxide to which 15 to 25% of methanol by volume is added.

References Cited

UNITED STATES PATENTS 2,437,091   3/1948   Goldsby et al. ____ 260—683.62

FOREIGN PATENTS 515,492   8/1955   Canada.

DELBERT E. GANTZ, *Primary Examiner.*

R. SHUBERT, G. J. CRASANAKIS,

*Assistant Examiners.*